(12) United States Patent
Wu et al.

(10) Patent No.: US 11,054,872 B2
(45) Date of Patent: Jul. 6, 2021

(54) ELECTRONIC DEVICE

(71) Applicant: Wistron Corporation, New Taipei (TW)

(72) Inventors: Huan-Chun Wu, New Taipei (TW); Chao-Yu Li, New Taipei (TW); Chin-Jung Li, New Taipei (TW); Chia-Jui Hsu, New Taipei (TW)

(73) Assignee: Wistron Corporation, New Taipei (TW)

( * ) Notice: Subject to any disclaimer, the term of this patent is extended or adjusted under 35 U.S.C. 154(b) by 0 days.

(21) Appl. No.: 16/780,916

(22) Filed: Feb. 4, 2020

(65) Prior Publication Data

US 2021/0149462 A1 May 20, 2021

(30) Foreign Application Priority Data

Nov. 14, 2019 (TW) .................................. 108215072

(51) Int. Cl.
*G06F 1/20* (2006.01)
*G06F 1/16* (2006.01)

(52) U.S. Cl.
CPC ............ *G06F 1/203* (2013.01); *G06F 1/1616* (2013.01); *G06F 1/1656* (2013.01); *G06F 1/1681* (2013.01)

(58) Field of Classification Search
CPC ...... G06F 1/203; G06F 1/1656; G06F 1/1616; G06F 1/1681
See application file for complete search history.

(56) References Cited

U.S. PATENT DOCUMENTS

| | | | | |
|---|---|---|---|---|
| 5,552,960 | A | * | 9/1996 | Nelson ..................... G06F 1/203 165/104.33 |
| 6,181,555 | B1 | * | 1/2001 | Haley .................... G06F 1/1616 361/679.21 |
| 7,480,141 | B2 | * | 1/2009 | Takenoshita ............ G06F 1/203 349/161 |

(Continued)

OTHER PUBLICATIONS

Kutz, Myer. (2015). Mechanical Engineers' Handbook, vol. 1—Materials and Engineering Mechanics (4th Edition)—4.3.1 Strengthening Mechanisms, (p. 153). John Wiley & Sons. Retrieved from https://app.knovel.com/hotlink/pdf/id:kt011UO9F5/mechanical-engineers/strengthening-mechanisms (Year: 2015).*

*Primary Examiner* — Abhishek M Rathod
(74) *Attorney, Agent, or Firm* — JCIPRNET

(57) ABSTRACT

An electronic device includes a first main body, a second main body, a pivoting mechanism, and a heat dissipation module. The second main body includes a first housing, a second housing, and a cover plate. The pivoting mechanism is pivotally connected between the first main body and the second main body. Two sides of the cover plate are pivotally connected to the second housing and the pivoting mechanism respectively. The heat dissipation module is disposed in the second main body and includes at least one elastic member. The elastic member is fixed between the first housing and the cover plate. In response to that the first main body is in unfolded position relative to the second main body through the pivoting mechanism, the pivoting mechanism drives the cover plate to be located between an open position relative to the second housing, so that the elastic member is stretched.

11 Claims, 10 Drawing Sheets

(56) References Cited

U.S. PATENT DOCUMENTS

| | | | |
|---|---|---|---|
| 2002/0018337 A1* | 2/2002 | Nakamura | G06F 1/166 |
| | | | 361/697 |
| 2009/0147469 A1* | 6/2009 | Chen | G06F 1/183 |
| | | | 361/679.55 |
| 2010/0157537 A1* | 6/2010 | Yu | H01L 23/433 |
| | | | 361/704 |
| 2010/0157540 A1* | 6/2010 | Yu | H01L 23/433 |
| | | | 361/710 |
| 2013/0201617 A1* | 8/2013 | Tsai | G06F 1/1616 |
| | | | 361/679.4 |
| 2014/0160669 A1* | 6/2014 | Wu | G06F 1/203 |
| | | | 361/679.46 |
| 2015/0116932 A1* | 4/2015 | Hung | G06F 1/1681 |
| | | | 361/679.55 |
| 2015/0153785 A1* | 6/2015 | Kao | G06F 1/1681 |
| | | | 361/679.55 |
| 2019/0335258 A1* | 10/2019 | Vaturi | H05K 5/0017 |

* cited by examiner

ELECTRONIC DEVICE

CROSS-REFERENCE TO RELATED APPLICATION

This application claims the priority benefit of Taiwan application serial no. 108215072, filed on Nov. 14, 2019. The entirety of the above-mentioned patent application is hereby incorporated by reference herein and made a part of this specification.

BACKGROUND OF THE INVENTION

1. Field of the Invention

The invention relates to an electronic device, and in particular, to an electronic device having a heat dissipation module.

2. Description of Related Art

Nowadays, notebook computers are designed to be increasingly thin. The distance between an upper cover and a lower cover of a host body of a notebook computer thus becomes increasingly small. As such, fan pressure in the host body increases, so that the heat dissipation capability is greatly reduced. In order to resolve the foregoing problems, a heat pipe is used to transfer heat to an air outlet most of the time, and the heat is expelled from a system by using a fan together with a heat dissipation fin. A larger heat dissipation area of the heat dissipation fin indicates that a more favorable heat dissipation effect is provided. However, the heat dissipation area of the heat dissipation fin that is directly related to the heat dissipation capability is limited to the height of the host body. Therefore, how to effectively increase the heat dissipation area of a heat dissipation structure is an important issue. In addition, sound performance of a speaker box in the host body is also limited to the distance between the upper cover and the lower cover of the host body, so how to arrange a speaker box configured for improving the sound effect in a limited space is an important issue.

SUMMARY OF THE INVENTION

The invention provides an electronic device including a heat dissipation module having an elastic member and capable of providing a favorable heat dissipation effect.

The electronic device of the invention includes a first main body, a second main body, a pivoting mechanism, and a heat dissipation module. The second main body includes a first housing and a second housing opposite to each other and a cover plate, where a first side of the cover plate is pivoted to the second housing. The pivoting mechanism is pivotally connected between the first main body and the second main body, where a second side of the cover plate is pivotally connected to the pivoting mechanism. The first main body and the second main body form a folded position or an unfolded position by the pivoting mechanism. The heat dissipation module is disposed in the second main body and includes at least one elastic member. The elastic member is fixed between the first housing and the cover plate. The pivoting mechanism drives the cover plate to be located in an open position relative to the second housing in responses to the unfolded position, so that the elastic member is stretched.

Based on the foregoing, in the design of the electronic device of the invention, the elastic member is fixed between the first housing and the cover plate, and the elastic member is stretched when being applied by an external force. In other words, a volume of the elastic member is adjustable. That is, the stretched elastic member may have a relatively large volume in comparison to the compressed elastic member. In this way, the elastic member of the heat dissipation module may occupy less space and have a reduced volume. In addition, in response to that the first main body is in unfolded position relative to the second main body through the pivoting mechanism, the pivoting mechanism may drive the cover plate to be located in an open position relative to the second housing, so that the elastic member is stretched. In other words, in response to that the cover plate is in the open position, a flow resistance caused by pressure may be reduced, so that the heat dissipation capability is further improved. In this way, the electronic device using the heat dissipation module of the invention may exhibit a favorable heat dissipation effect.

To make the features and advantages of the invention clear and easy to understand, the following gives a detailed description of embodiments with reference to accompanying drawings.

DESCRIPTION OF THE EMBODIMENTS

Figure 1A:
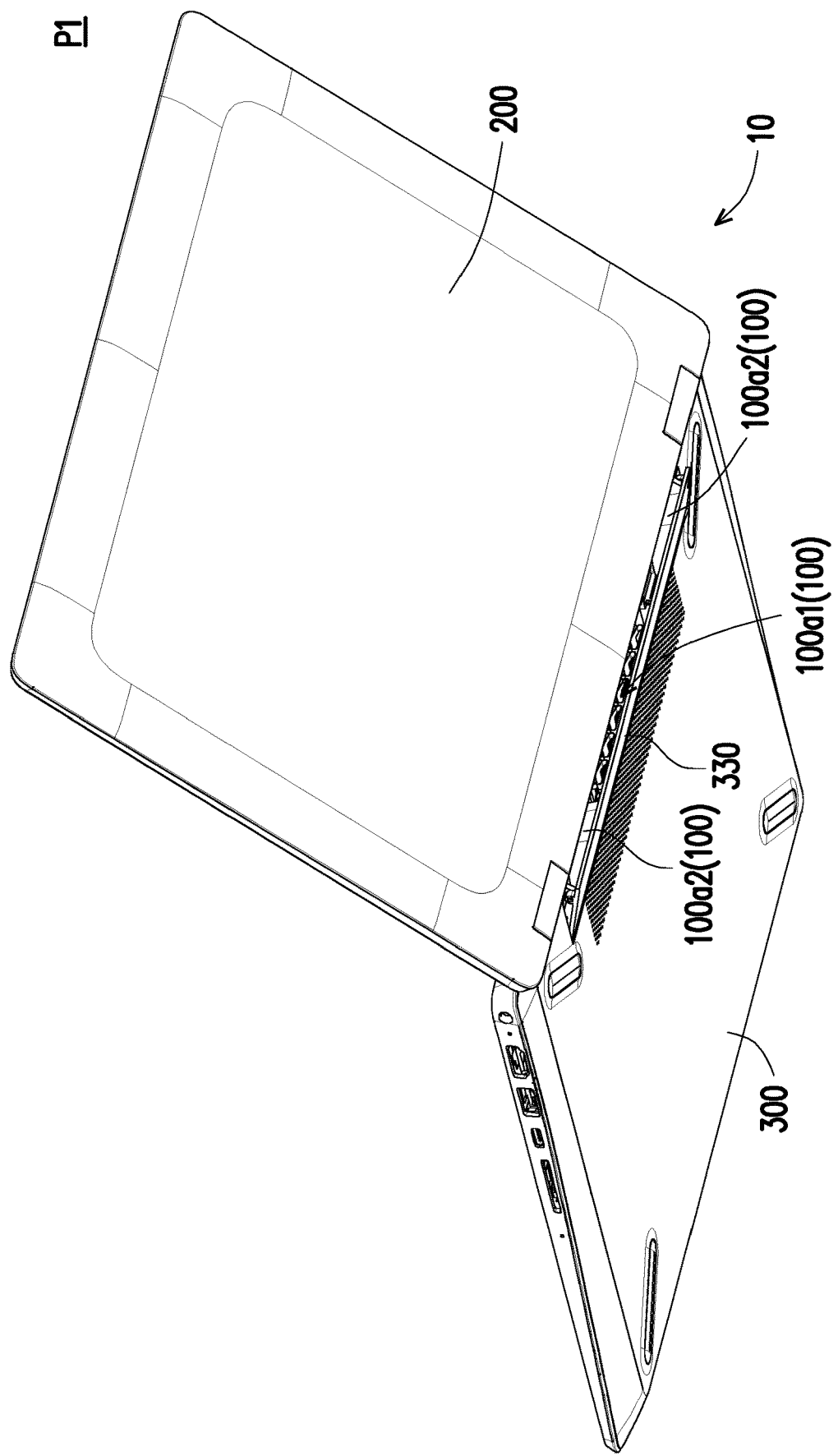
FIG. 1A is a schematic three-dimensional view of an electronic device being unfolded according to an embodiment of the invention.
Figure 1B:
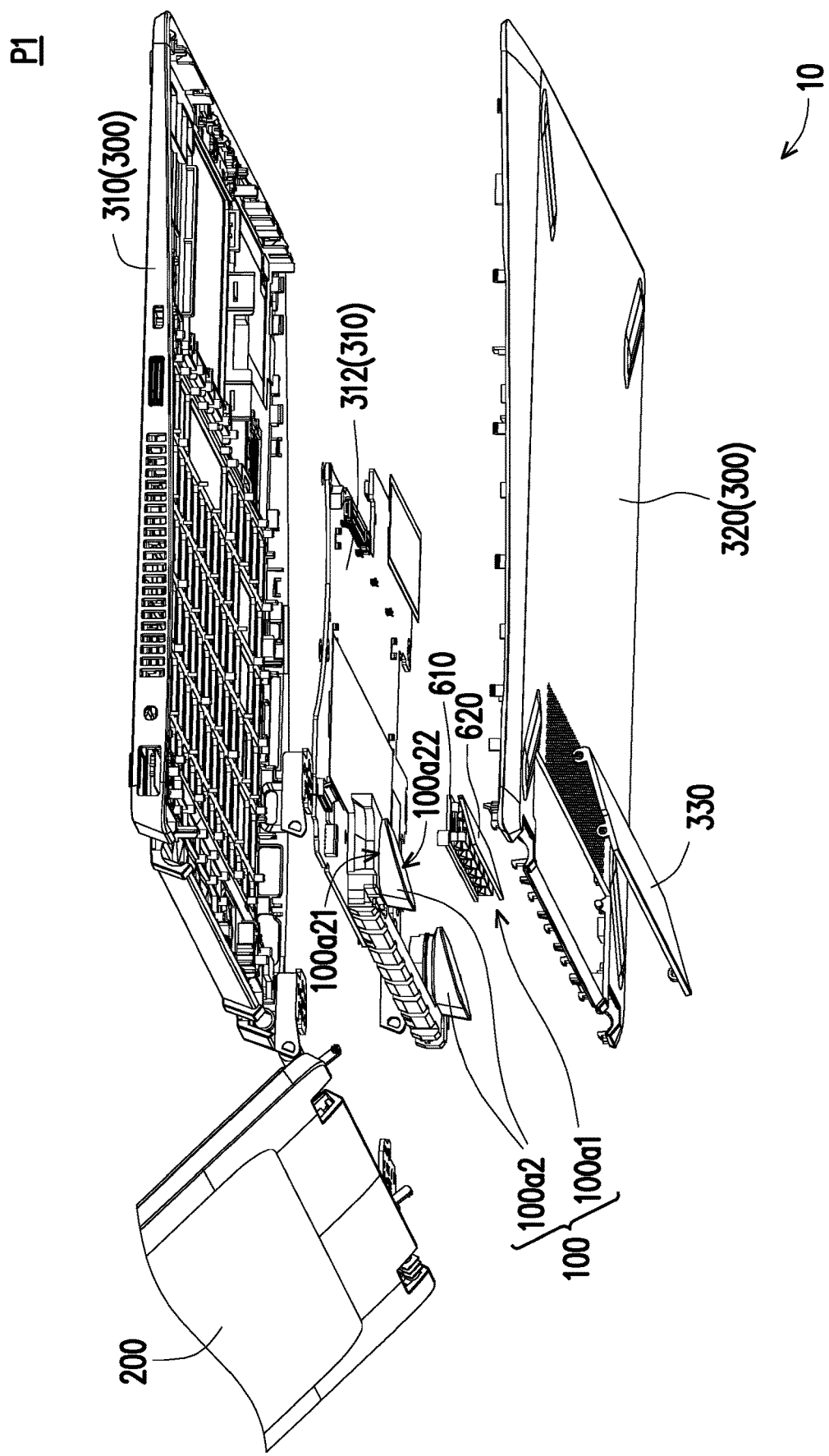
FIG. 1B is a schematic three-dimensional exploded view of the electronic device of FIG. 1A being unfolded.
Figure 1C:
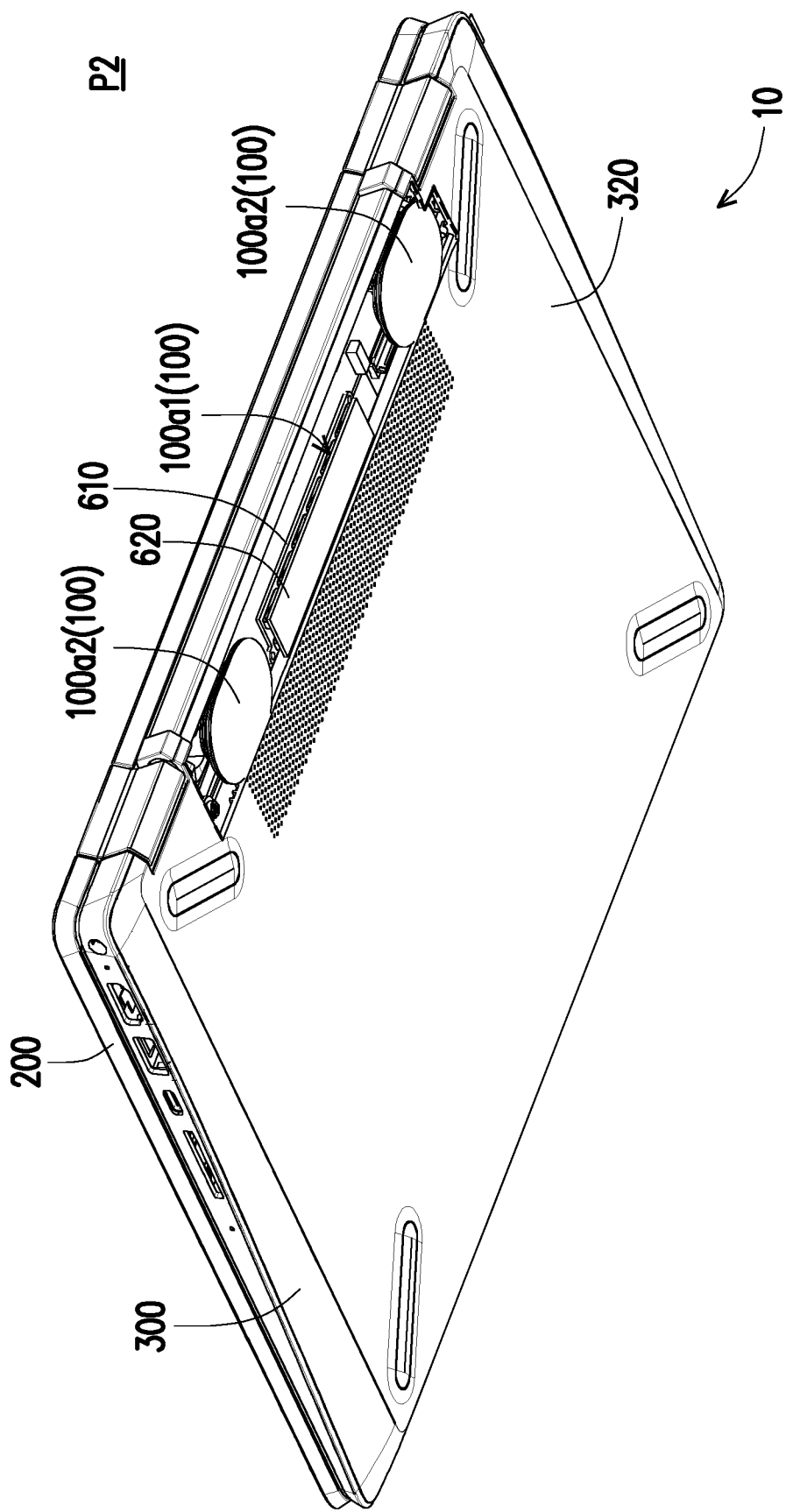
FIG. 1C is a schematic three-dimensional view of the electronic device of FIG. 1A being folded.
Figure 1D:
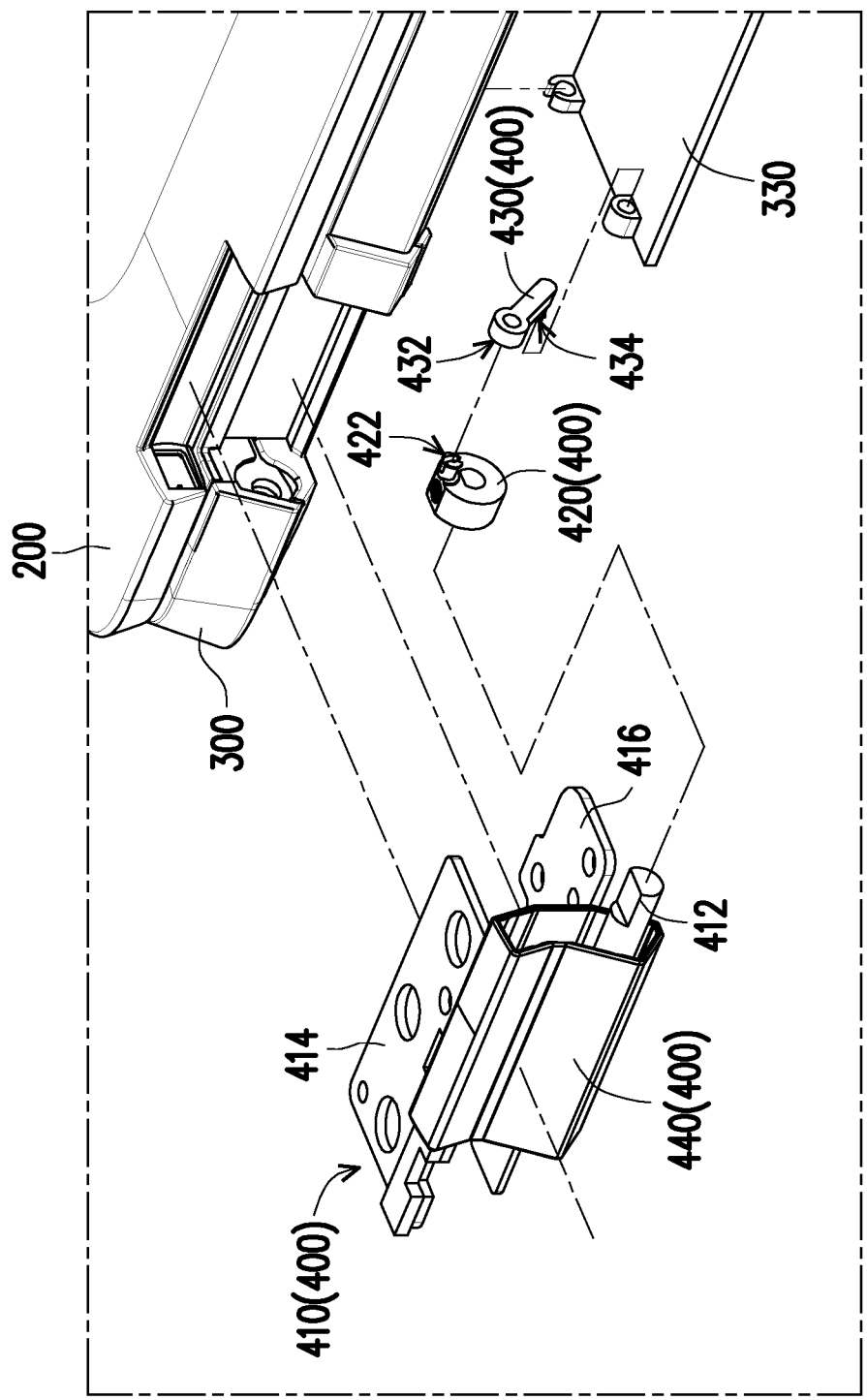
FIG. 1D is a schematic three-dimensional exploded view of a pivoting mechanism and a cover plate of the electronic device of FIG. 1A.
Figure 2A:
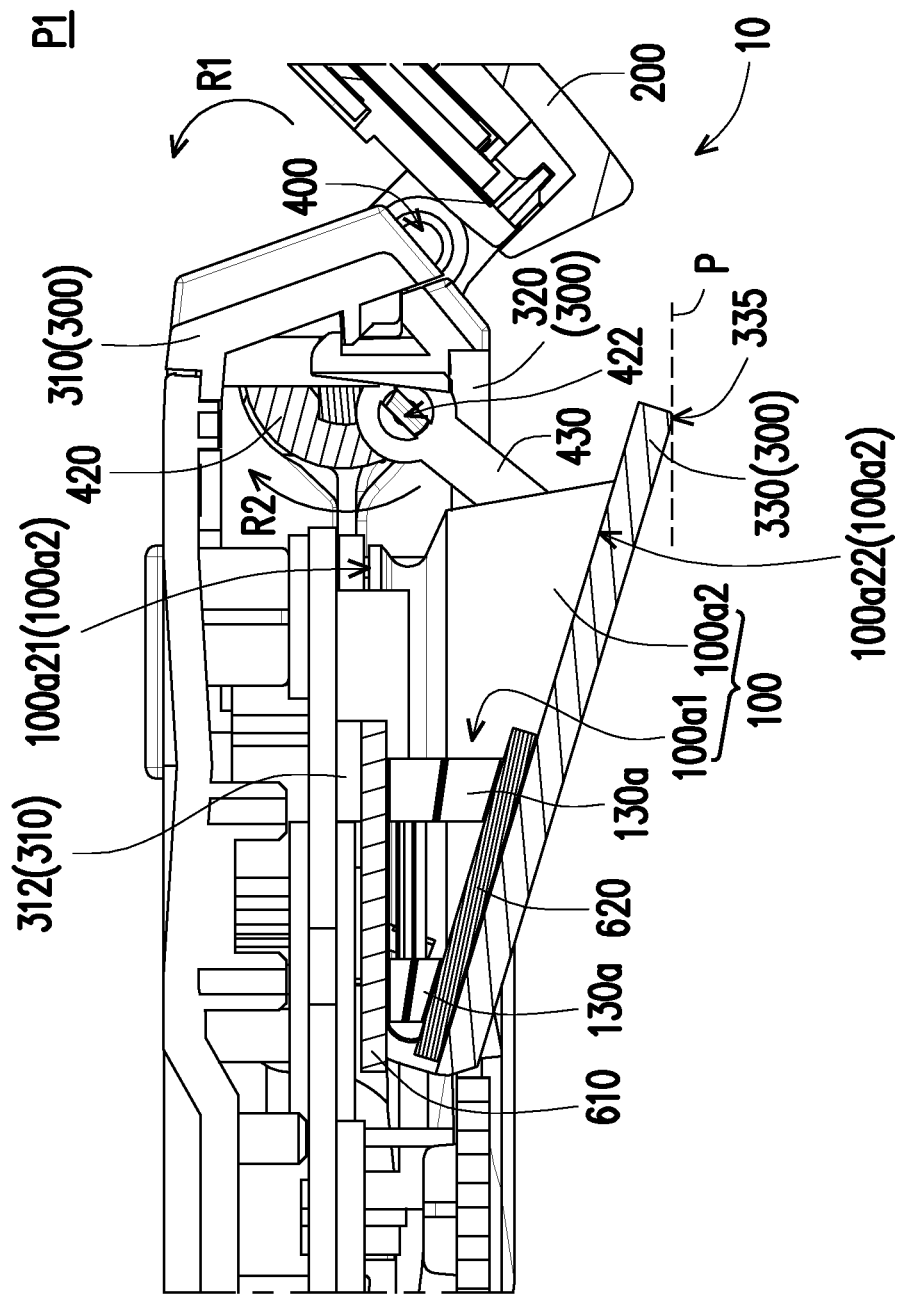
FIG. 2A is a schematic cross-sectional view of the electronic device of FIG. 1A.
Figure 2B:
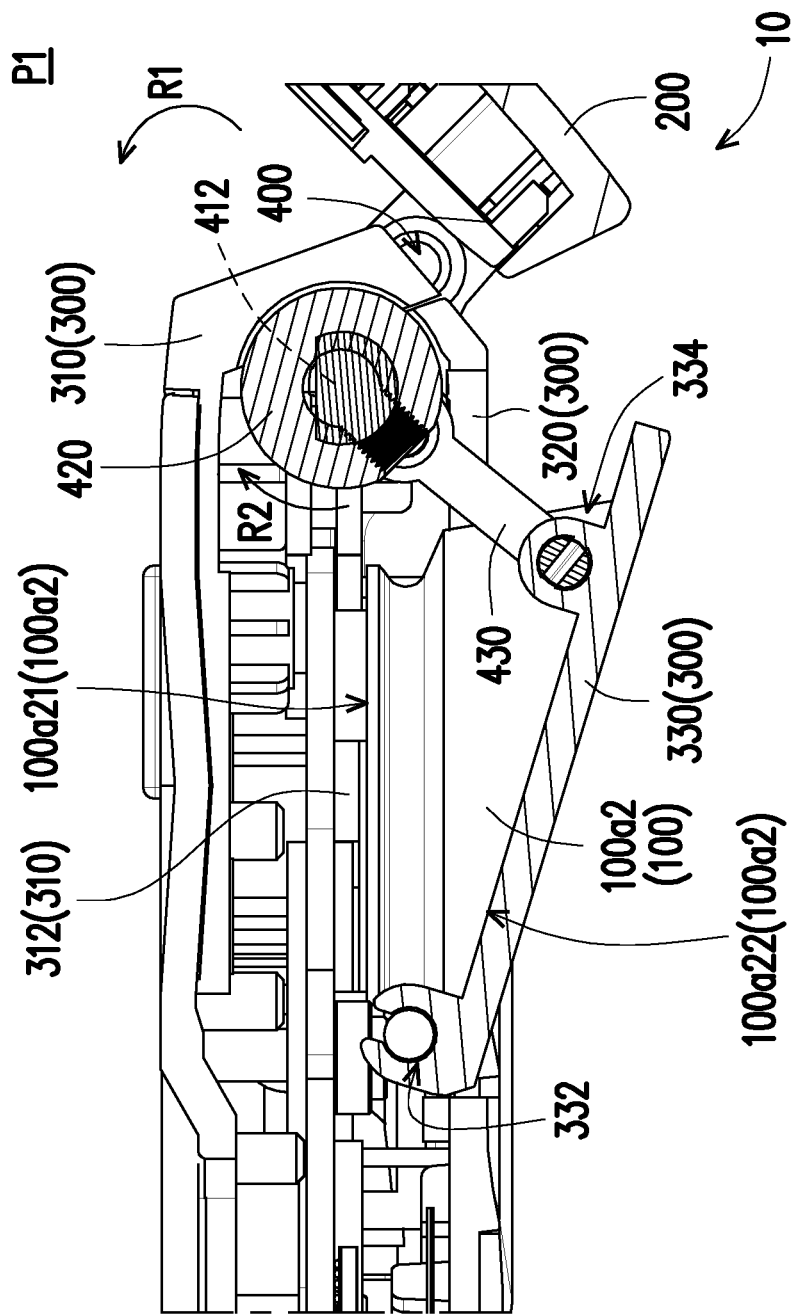
FIG. 2B is another schematic cross-sectional view of the electronic device of FIG. 1A.
Figure 2C:
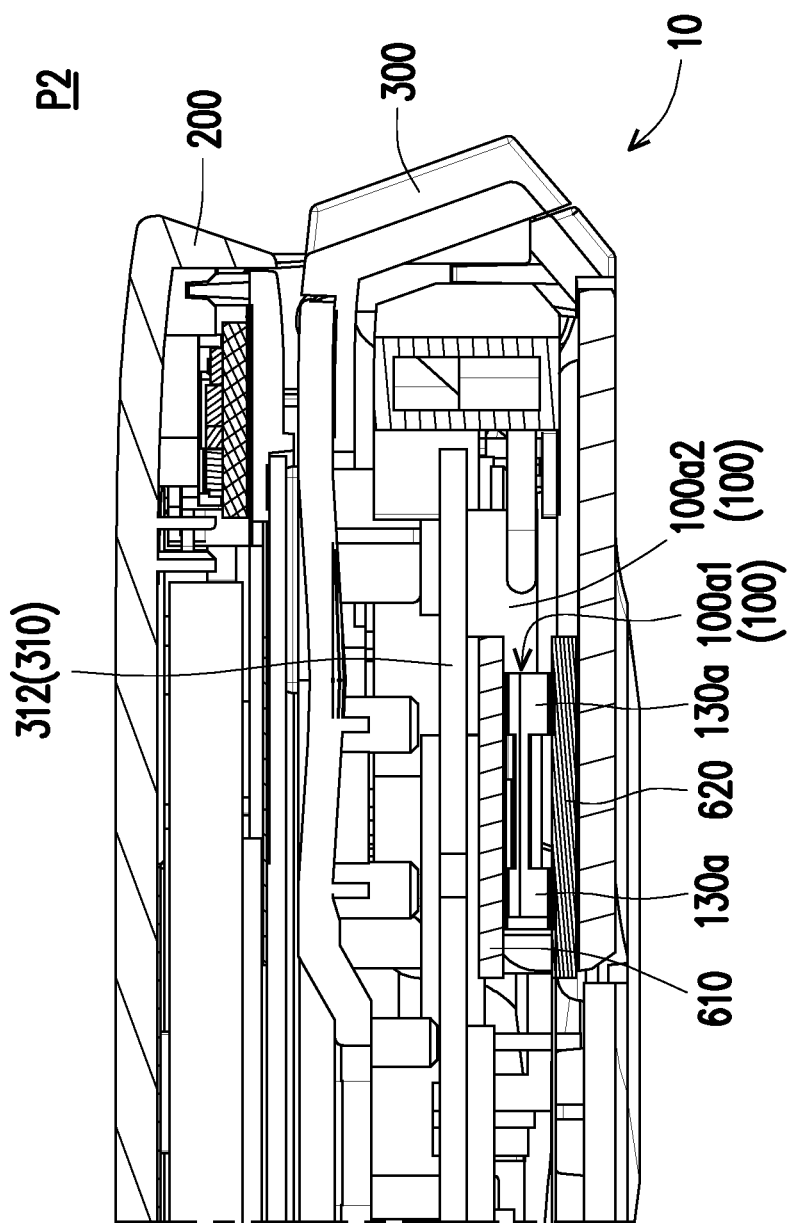
FIG. 2C is a schematic cross-sectional view of the electronic device of FIG. 1C.

FIG. 1A is a schematic three-dimensional view of an electronic device being unfolded according to an embodiment of the invention. FIG. 1B is a schematic three-dimensional exploded view of the electronic device of FIG. 1A being unfolded. FIG. 1C is a schematic three-dimensional view of the electronic device of FIG. 1A being folded. FIG. 1D is a schematic three-dimensional exploded view of a pivoting mechanism and a cover plate of the electronic device of FIG. 1A. FIG. 2A is a schematic cross-sectional view of the electronic device of FIG. 1A. FIG. 2B is another schematic cross-sectional view of the electronic device of FIG. 1A. FIG. 2C is a schematic cross-sectional view of the electronic device of FIG. 1C. It should be noted that, for ease of description, the cover plate is omitted in FIG. 1C, FIG. 2A and FIG. 2C are views taken along a cross-sectional line in which the heat dissipation module is located, and FIG. 2B is a view taken along a cross-sectional line in which an elastic speaker box housing is located.

Referring to FIG. 1A, FIG. 1B, FIG. 1C, FIG. 1D, FIG. 2A, FIG. 2B, and FIG. 2C, an electronic device 10 of the present embodiment includes a heat dissipation module 100, a first main body 200, a second main body 300, and a pivoting mechanism 400. The second main body 300 includes a first housing 310 and a second housing 320 opposite to each other and a cover plate 330, where a first side 332 of the cover plate 330 is pivoted to the second housing 320. The pivoting mechanism 400 is pivotally connected between the first main body 200 and the second main body 300, where a second side 334 of the cover plate 330 is pivotally connected to the pivoting mechanism 400. The first main body 200 and the second main body 300 form a folded position or an unfolded position by the pivoting mechanism 400. The heat dissipation module 100 is disposed in the second main body 300 and includes at least one elastic member (one elastic member 100a1 and two elastic members 100a2 are schematically shown), where the elastic members 100a1 and 100a2 are fixed between the first housing 310 and the cover plate 330. In response to that the first main body 200 is in the unfolded position or the folded position relative to the second main body 300 through the pivoting mechanism 400, the pivoting mechanism 400 drives the cover plate 330 to be located between an open position P1 and a closed position P2 relative to the second housing 320, so that the elastic members 100a1 and 100a2 are stretched or compressed. The electronic device 10 herein is, for example, a notebook computer, the first main body 200 is, for example, a screen module, and the second main body 300 is, for example, a host.

Figure 3A:
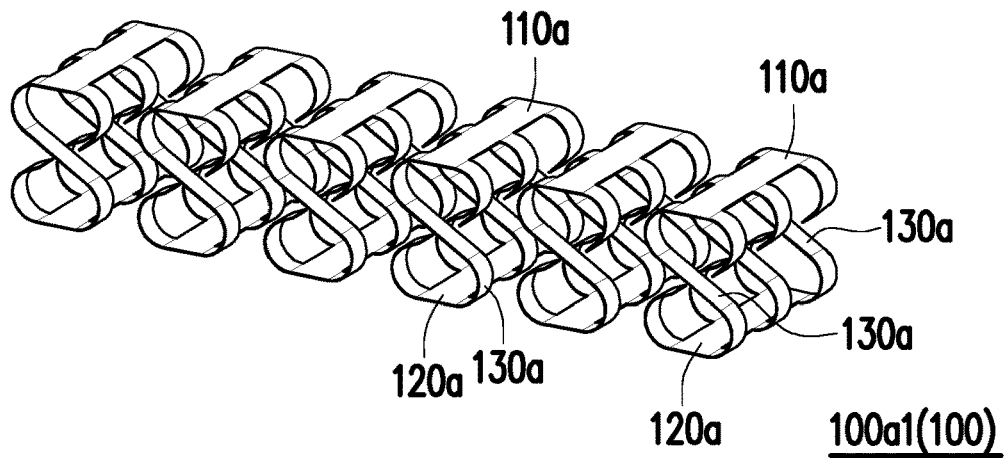
FIG. 3A is a schematic three-dimensional view of a heat dissipation module according to an embodiment of the invention.

In detail, referring to FIG. 1B and FIG. 3A together, the elastic member 100a1 of the present embodiment includes at least one first connecting sheet (a plurality of first connecting sheets 110a are schematically shown), at least one second connecting sheet (a plurality of second connecting sheets 120a are schematically shown), and a plurality of elastic fins 130a. The first connecting sheet 110a is fixed to the first housing 310 through, for example, an adhesive layer 610. The second connecting sheet 120a is disposed relative to the first connecting sheet 110a, and is fixed to the cover plate 330 through, for example, an adhesive layer 620. In another embodiment, the first connecting sheet 110a and the second connecting sheet 120a of the elastic member 100a1 may also be fixed onto the first housing 310 and the cover plate 330 through locking or in other suitable manners, which is not limited herein. The elastic fin 130a is connected between the first connecting sheet 110a and the second connecting sheet 120a, where the elastic fin 130a is arranged, for example, in a matrix, but is not limited thereto. As shown in FIG. 3A, the first connecting sheet 110a and the second connecting sheet 120a are arranged at an equal interval, and each first connecting sheet 110a and the corresponding second connecting sheet 120a are connected to the elastic fin 130a in a same column.

In particular, the elastic fin 130a of the present embodiment is stretched or compressed as affected by an external force. In other words, the elastic fin 130a of the present embodiment has an elastic restoring force and can be stretched or compressed through the external force. The elastic fin 130a herein is made of copper, and a thermal conductivity coefficient of the elastic fin 130a is between 105 W/(m·K) and 133 W/(m·K). Further, the thermal conductivity coefficient of the elastic fin 130a is between 105 W/(m·K) and 130 W/(m·K) at a normal temperature of 20° C. and is between 130 W/(m·K) and 133 W/(m·K) at a high temperature of 200° C. In other words, the elastic fin 130a of the present embodiment may be used to conduct heat and dissipate heat. A shape of the elastic fin 130a herein is implemented as an S-shape, but is not limited thereto.

In short, since the elastic fin 130a may be stretched or compressed when being applied by an external force, a heat dissipation area of the elastic fin 130a is adjustable. That is, the stretched elastic member 130a may have a relatively large heat dissipation area compared to the compressed elastic member 130a. Therefore, the heat dissipation module 100 of the present embodiment may not only exhibit a favorable heat dissipation effect but also occupy less space and have a reduced volume.

In addition, the elastic member 100a2 of the present embodiment is, for example, an elastic speaker box housing disposed in the second main body 300 and located at both sides of the elastic member 100a1. Herein, a first side 100a21 and a second side 100a22 of the elastic member 100a2 are opposite to each other and are respectively fixed between a plate member 312 of the first housing 310 and the cover plate 330.

Still further, referring to FIG. 1D, FIG. 2A, FIG. 2B, and FIG. 2C together, the pivoting mechanism 400 of the present embodiment includes a hinge structure 410, a transmission component 420, and a connecting rod assembly 430. The hinge structure 410 is pivoted between the first main body 200 and the second main body 300 and includes a rotating shaft 412, a first fixing plate 414, and a second fixing plate 416. The first main body 200 is assembled onto the first fixing plate 414, and the second main body 300 is assembled onto the second fixing plate 416. The hinge structure 410 herein is, for example, a mechanism composed of four gears (not shown). Herein, when a first gear and a third gear rotate in a counter-clockwise direction, a second gear and a fourth gear rotate in a clockwise direction, but are not limited thereto. For example, in another embodiment that is not shown, the hinge structure may be a mechanism composed of three gears (not shown).

The transmission component 420 of the pivoting mechanism 400 is disposed on the rotating shaft 412 and has an assembly portion 422. The transmission component 420 herein is, for example, a cam, but is not limited thereto. The connecting rod assembly 430 has a first end 432 and a second end 434, where the first end 432 is sleeved on the assembly portion 422 of the transmission component 420, and the second end 434 is pivotally connected to the cover plate 330. The connecting rod assembly 430 herein is, for example, a pull rod, but is not limited thereto. If the hinge structure 410 is a mechanism composed of four gears (not shown), in response to that the first main body 200 rotates in a first clock direction R1 relative to the second main body 300 through the pivoting mechanism 400 and is unfolded, the transmission component 420 rotates in a second clock direction R2 to drive the connecting rod assembly 430 to unfold the cover plate 330. The first clock direction R1 herein is opposite to the second clock direction R2. The first clock direction R1 is, for example, the counter-clockwise direction, and the second clock direction R2 is, for example, a clockwise direction. In addition, the pivoting mechanism 400 of the present embodiment further includes a hinge cover 440 sleeved on the hinge structure 410. The hinge cover 440 is an exterior member for shielding the hinge structure 410.

When the first main body 200 is in the unfolded position or the folded position relative to the second main body 300 through the pivoting mechanism 400, the rotating shaft 412 of the pivoting mechanism 400 drives the transmission component 420 to link. In this way, the connecting rod assembly 430 drives the cover plate 330 to be located between the open position P1 and the closed position P2 relative to the second housing 320, so that the elastic members 100a1 and 100a2 are stretched or compressed. In other words, in response to that the cover plate 330 is located in the open position P1 relative to the second housing 320, a flow resistance inside the second main body 300 may be reduced. In this case, if a fan (not shown) is disposed in the second main body 300, fan efficiency may be improved by reducing the flow resistance. That is, increased volume of air may be expelled at a same rotating speed. Furthermore, in response to that the elastic member 100a1 is stretched and a heat dissipation area is thus increased, a heat dissipation capability of the elastic member 100a1 may be improved. On the other hand, in response to that the elastic member 100a2 is stretched, a volume of the elastic member 100a2 may be increased, so that a sound effect of the electronic device 10 may be improved as the volume of the elastic member 100a2 is changed.

Since the cam is used as the transmission component 420 in the present embodiment, in response to that the cover plate 330 is opened, an angle of the cover plate 330 relative to the second housing 320 is, for example, between 12 degrees and 16.8 degrees. In this case, an angle of the first main body 200 relative to the second main body 300 is between 90 degrees and 180 degrees. In an embodiment, in response to that an angle of the cover plate 330 relative to the second housing 320 is 14 degrees, an angle of the first main body 200 relative to the second main body 300 is 90 degrees. In response to that the angle of the cover plate 330 relative to the second housing 320 is 16.8 degrees, the angle of the first main body 200 relative to the second main body 300 is 135 degrees. In response to that the angle of the cover plate 330 relative to the second housing 320 is 12 degrees, the angle of the first main body 200 relative to the second main body 300 is 180 degrees. The foregoing angles are merely used as examples for description, and the angles are related to a type and an external contour of the cam. In addition, as shown in FIG. 2A, in response to that the cover plate 330 is opened, one end of the cover plate 330 is a supporting portion 335 that may abut against a horizontal plane P, so that the second main body 300 may be lifted up as the cover plate 330 is opened.

It should be noted that, referring to FIG. 1B, FIG. 2A, and FIG. 3A, in response to that the cover plate 330 is located in the open position P1 relative to the second housing 320, a degree of compression of the elastic fin 130a of the elastic member 100a1 relatively close to an inner side of the second main body 300 is greater than a degree of compression of the elastic fin 130a away from the inner side of the second main body 300. In other words, the elastic fin 130a of the elastic member 100a1 away from the inner side of the second main body 300 is elongated to a greater extent than the elastic fin 130a relatively close to the inner side of the second main body 300. In other words, a distance between the first connecting sheet 110a and the second connecting sheet 120a is increased gradually in a direction from inside the second main body 300 to away from the second main body 300. In short, in response to that the cover plate 330 is located in the open position P1 relative to the second housing 320, the elastic fins 130a at different positions in the elastic member 100a1 are elongated to different extents. On the other hand, with reference to FIG. 2C, in response to that the cover plate 330 is located in the closed position P2 relative to the second housing 320, the elastic fins 130a at different positions in the elastic member 100a1 are subjected to a same degree of compression.

Referring to FIG. 2B, when the first main body 200 is in the unfolded position relative to the second main body 300 through the pivoting mechanism 400, the pivoting mechanism 400 drives the cover plate 330 to be located in the open position P1 relative to the second housing 320. In this way, the elastic member 100a2 is stretched, and a distance between the first side 100a21 and the second side 100a22 of the elastic member 100a2 is increased gradually in the direction from inside the second main body 300 to away from the second main body 300. On the other hand, referring to FIG. 2B and FIG. 2C together, when the first main body 200 is in the unfolded position relative to the second main body 300 through the pivoting mechanism 400, the pivoting mechanism 400 drives the cover plate 330 to be located in the closed position P2 relative to the second housing 320. In this way, the elastic member 100a2 is compressed, and the distance between the first side 100a21 and the second side 100a22 of the elastic member 100a2 is shortened.

In short, the heat dissipation module 100 having the elastic member 100a1 of the present embodiment may exhibit a favorable heat dissipation effect. Since the heat dissipation module 100 has the elastic members 100a1 and 100a2, the heat dissipation module 100 occupies less space and has a reduced volume, and that the electronic device 10 of the present embodiment adopting the heat dissipation module 100 may feature a small volume and thin design and thus satisfies the trend of providing a light and thin product having a compact size. In addition, when the elastic member 100a2 is stretched, the volume of the elastic member 100a2 may be increased, and a bass effect of may be enhanced.

It is worth mentioning that in the electronic device 10, the heat dissipation module 100 includes one elastic member 100a1 and two elastic members 100a2. However, in other embodiments, the heat dissipation module 100 may not include the elastic member 100a1, or the heat dissipation module 100 may not include the elastic members 100a2. In other words, the heat dissipation module 100 may only be composed of the elastic member 100a1 or the elastic members 100a2, which still falls within the protection scope of the invention.

It needs to be noted herein that assembly numbers and a portion of the foregoing embodiments are still used in the following embodiments. The same or similar reference numbers are used to represent the same or similar assemblies, and descriptions about the same technical content are omitted. For the description of the omitted part, reference may be made to the foregoing embodiments, and the descriptions of the following embodiments are omitted herein.

Figure 3B:
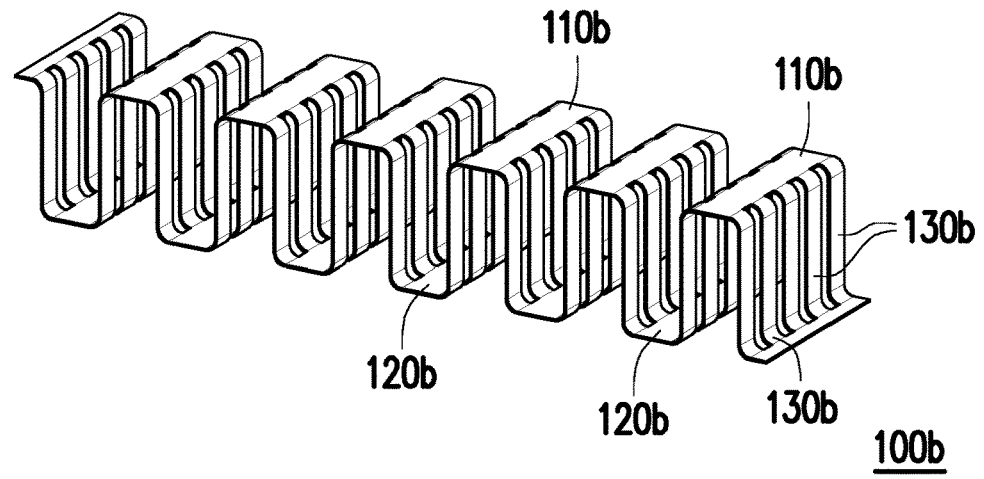
FIG. 3B is a schematic three-dimensional view of a heat dissipation module according to another embodiment of the invention.

FIG. 3B is a schematic three-dimensional view of a heat dissipation module according to another embodiment of the invention. Referring to FIG. 3B and FIG. 3A, a heat dissipation module 100b of the present embodiment is similar to the elastic member 100a1 of the heat dissipation module 100 of FIG. 3A. A difference therebetween is that a shape of an elastic fin 130b of the heat dissipation module 100b of the present embodiment is implemented as a square-wave shape, and a first connecting sheet 110b and a second connecting sheet 120b are disposed in an alternating manner.

Figure 3C:
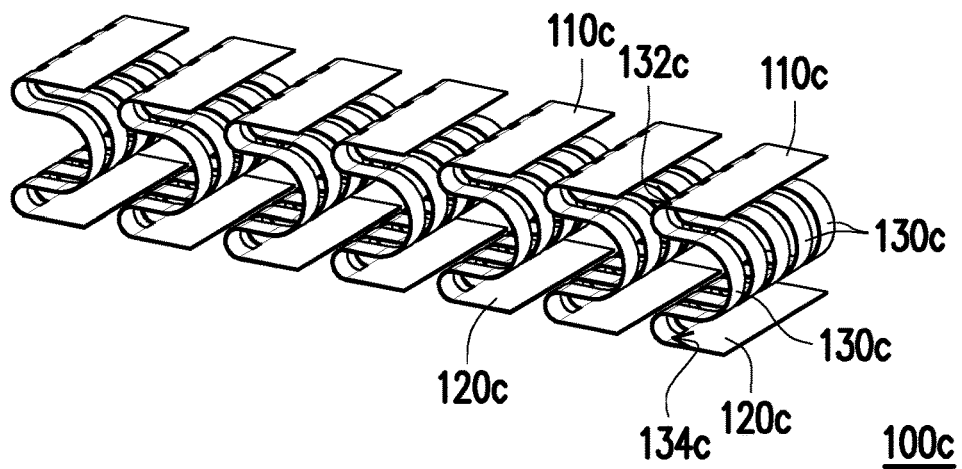
FIG. 3C is a schematic three-dimensional view of a heat dissipation module according to another embodiment of the invention.

FIG. 3C is a schematic three-dimensional view of a heat dissipation module according to another embodiment of the invention. Referring to FIG. 3C and FIG. 3A together, a heat dissipation module 100c of the present embodiment is similar to the elastic member 100a1 of the heat dissipation module 100 of FIG. 3A. A difference therebetween is that a shape of each of elastic fins 130c of the heat dissipation module 100c of the present embodiment is implemented as an M shape in a side view, and both ends 132c and 134c of each of the elastic fins 130c are respectively connected to the first connecting sheet 110c and the second connecting sheet 120c.

Figure 4A:
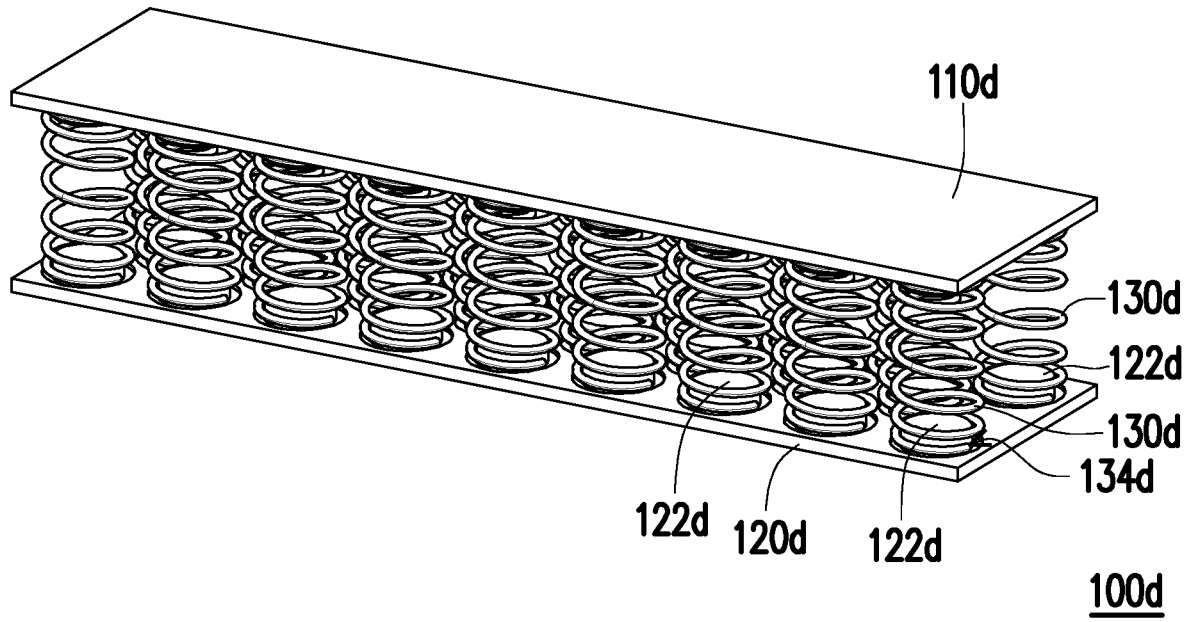
FIG. 4A is a schematic three-dimensional view of a heat dissipation module according to another embodiment of the invention.
Figure 4B:
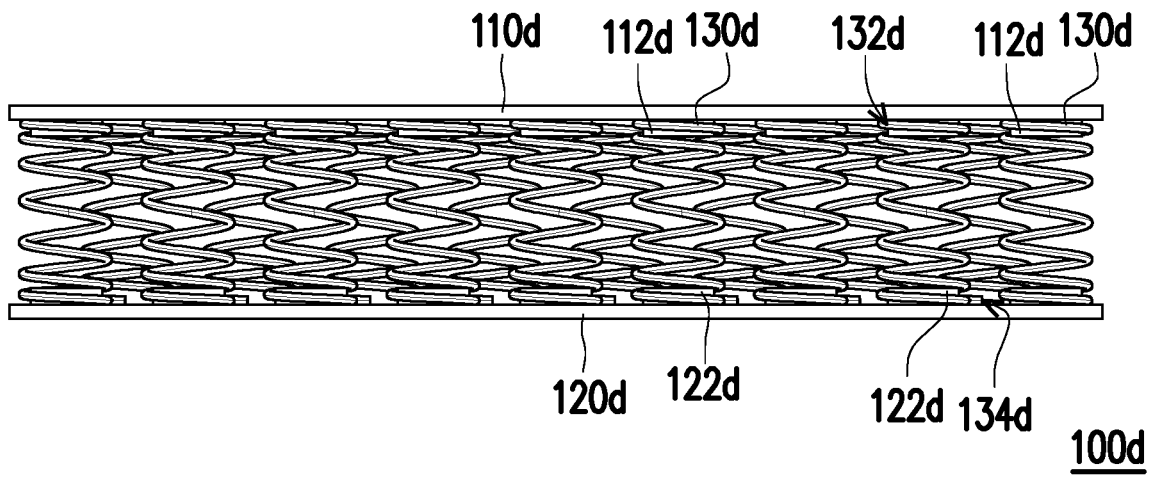
FIG. 4B is a schematic side view of the heat dissipation module of FIG. 4A.

FIG. 4A is a schematic three-dimensional view of a heat dissipation module according to another embodiment of the invention. FIG. 4B is a schematic side view of the heat dissipation module of FIG. 4A. Referring to FIG. 4A, FIG. 4B, and FIG. 3A together, a heat dissipation module 100d of the present embodiment is similar to the elastic member 100a1 of the heat dissipation module 100 of FIG. 3A. A difference therebetween is that a shape of each of elastic fins 130d of the heat dissipation module 100d of the present embodiment is implemented as a helical-spring shape, and the elastic fins 130d are arranged in an alternating manner. In addition, there is one first connecting sheet 110d and one second connecting sheet 120d in the present embodiment. The first connecting sheet 110d herein includes a plurality of first fixing posts 112d, and the second connecting sheet 120d includes a plurality of second fixing posts 122d. Both ends 132d and 134d of each elastic fin 130d are respectively fixed onto a corresponding first fixing post 112d and a corresponding second fixing post 122d.

Figure 5A:
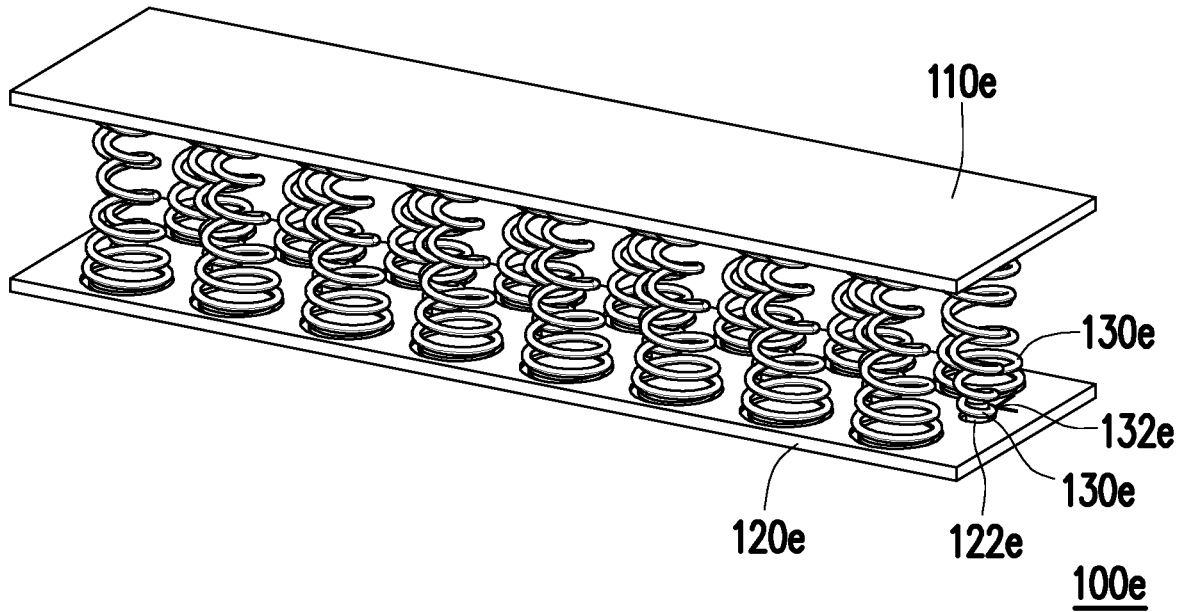
FIG. 5A is a schematic three-dimensional view of a heat dissipation module according to another embodiment of the invention.
Figure 5B:
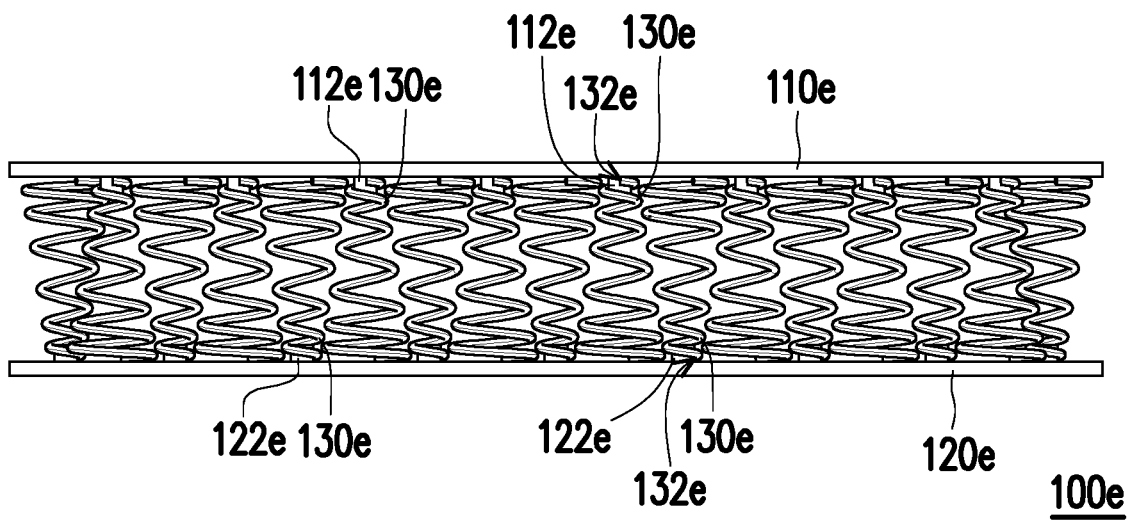
FIG. 5B is a side view of the heat dissipation module of FIG. 5A.

FIG. 5A is a schematic three-dimensional view of a heat dissipation module according to another embodiment of the invention. FIG. 5B is a side view of the heat dissipation module of FIG. 5A. Referring to FIG. 5A, FIG. 5B, and FIG. 3A, a heat dissipation module 100e of the present embodiment is similar to the elastic member 100a1 of the heat dissipation module 100a of FIG. 3A. A difference therebetween is that a shape of each of elastic fins 130e of the heat dissipation module 100e of the present embodiment is implemented as a conical-spring shape, and the elastic fins 130e are arranged in an alternating manner. Each of the elastic fins 130e herein in front and rear rows is in a conical-spring shape with a small top and a large bottom, and each of the elastic fins 130e in a middle row is in a conical-spring shape with a large top and a small bottom. In addition, there is one first connecting sheet 110e and one second connecting sheet 120e in the present embodiment. The first connecting sheet 110e herein includes a plurality of first fixing posts 112e, and the second connecting sheet 120e includes a plurality of second fixing posts 122e. One end 132e of each elastic fins 130e is fixed onto a corresponding first fixing post 112e and a corresponding second fixing post 122e.

In short, the elastic fins 130b, 130c, 130d, and 130e of the heat dissipation modules 100b, 100c, 100d, and 100e of the present embodiment may be stretched or compressed when being applied by an external force. In other words, a heat dissipation area of each of the elastic fins 130b, 130c, 130d, and 130e is adjustable. That is, stretched elastic fins 130b, 130c, 130d, and 130e may have a relatively large heat dissipation area compared to the compressed elastic fins 130b, 130c, 130d, and 130e. Therefore, the heat dissipation modules 100b, 100c, 100d, and 100e of the present embodiment may not only exhibit a favorable heat dissipation effect but also occupy less space and have a reduced volume.

Based on the foregoing, in the design of the electronic device of the invention, the elastic member is fixed between the first housing and the cover plate, and the elastic member is stretched or compressed under when being applied by an external force. In other words, the volume of the elastic member is adjustable. That is, the stretched elastic member may have a relatively large volume in comparison to the compressed elastic member. In this way, the elastic member of the heat dissipation module may occupy a less space and feature a reduced volume. In addition, when the first main body is in the unfolded position or the folded position relative to the second main body through the pivoting mechanism, the pivoting mechanism may drive the cover plate to be located between the open position and the closed position relative to the second housing, so that the elastic member is stretched or compressed. In other words, in response to that the cover plate is in the open position, a flow resistance caused by pressure may be reduced, so that the heat dissipation capability is further improved. In this way, the electronic device using the heat dissipation module of the invention may exhibit a favorable heat dissipation effect.

Although the invention is described with reference to the above embodiments, the embodiments are not intended to limit the invention. A person of ordinary skill in the art may make variations and modifications without departing from the spirit and scope of the invention. Therefore, the protection scope of the invention should be subject to the appended claims.

What is claimed is:
1. An electronic device, comprising:
a first main body;
a second main body comprising a first housing and a second housing opposite to each other and a cover plate, wherein a first side of the cover plate is pivoted to the second housing;
a pivoting mechanism pivotally connected between the first main body and the second main body, wherein a second side of the cover plate is pivotally connected to the pivoting mechanism, and the first main body and the second main body form a folded position or an unfolded position by the pivoting mechanism; and
a heat dissipation module disposed in the second main body and comprising at least one elastic member, wherein the at least one elastic member is fixed between the first housing and the cover plate, and the pivoting mechanism drives the cover plate to be located in an open position relative to the second housing in responses to the unfolded position, so that the at least one elastic member is stretched,
wherein the at least one elastic member comprises at least one first elastic member, the at least one first elastic member comprises at least one first connecting sheet, at least one second connecting sheet and a plurality of elastic fins, the plurality of elastic fins are connected between the at least one first connecting sheet and the at least one second connecting sheet, and the pivoting mechanism drives the cover plate to be located in the open position relative to the second housing in response to the unfolded position so that the elastic fins are stretched and a distance between the at least one first connecting sheet and the at least one second connecting sheet is increased, wherein the at least one first connecting sheet comprises a plurality of first fixing posts, the at least one second connecting sheet comprises a plurality of second fixing posts, and one side of each of the elastic fins is fixed onto a corresponding first fixing post or a corresponding second fixing post.

2. An electronic device, comprising:

a first main body;

a second main body comprising a first housing and a second housing opposite to each other and a cover plate, wherein a first side of the cover plate is pivoted to the second housing;

a pivoting mechanism pivotally connected between the first main body and the second main body, wherein a second side of the cover plate is pivotally connected to the pivoting mechanism, and the first main body and the second main body form a folded position or an unfolded position by the pivoting mechanism; and a heat dissipation module disposed in the second main body and comprising at least one elastic member, wherein the at least one elastic member is fixed between the first housing and the cover plate, and the pivoting mechanism drives the cover plate to be located in an open position relative to the second housing in responses to the unfolded position, so that the at least one elastic member is stretched, wherein the pivoting mechanism comprises:
a hinge structure pivoted between the first main body and the second main body and comprising a rotating shaft;
a transmission component disposed on the rotating shaft and comprising an assembly portion; and
a connecting rod assembly comprising a first end and a second end, wherein the first end is sleeved on the assembly portion of the transmission component, and the second end is pivotally connected to the cover plate, wherein when the first main body rotates in a first clock direction relative to the second main body through the pivoting mechanism and is unfolded, the transmission component rotates in a second clock direction to drive the connecting rod assembly to unfold the cover plate, and the first clock direction is opposite to the second clock direction.

3. The electronic device according to claim 2, wherein the pivoting mechanism drives the cover plate to be located in a closed position relative to the second housing in responses to the folded position, so that the at least one elastic member is compressed.

4. The electronic device according to claim 2, wherein each of the elastic fins is made of copper, and a thermal conductivity coefficient of each of the elastic fins is between 105 W/(m·K) and 133 W/(m·K).

5. The electronic device according to claim 2, wherein the elastic fins are located between the two elastic speaker box housings, a sound effect of the electronic device is improved as the volume of the two elastic speaker box housings are changed.

6. The electronic device according to claim 2, wherein a shape of each of the elastic fins is an S-shape, an M-shape, a square-wave shape, a conical-spring shape, or a helical-spring shape.

7. The electronic device according to claim 2, wherein
the at least one first connecting sheet fixed to the first housing; and
the at least one second connecting sheet disposed relative to the at least one first connecting sheet and fixed to the cover plate, wherein the pivoting mechanism drives the cover plate to be located in the open position relative to the second housing in response to the unfolded position, so that the elastic fins and the two elastic speaker box housings are stretched, and a distance between the at least one first connecting sheet and the at least one second connecting sheet and distances between first sides and second sides that are opposite to each other and that are of the two elastic speaker box housings are increased.

8. The electronic device according to claim 1, wherein the pivoting mechanism drives the cover plate to be located in the closed position relative to the second housing in response to the folded position, so that the elastic fins and the two elastic speaker box housings are compressed, and a distance between the at least one first connecting sheet and the at least one second connecting sheet and distances between first sides and second sides that are opposite to each other and that are of the two elastic speaker box housings are decreased.

9. The electronic device according to claim 2, wherein one end of the cover plate is a supporting portion, the pivoting mechanism drives the cover plate to be located in the open position relative to the second housing in response to the unfolded position, and the supporting portion abuts against a horizontal plane, so that the second main body is lifted up as the cover plate is opened.

10. The electronic device according to claim 2, wherein the pivoting mechanism comprises:
a hinge structure pivoted between the first main body and the second main body and comprising a rotating shaft;
a transmission component disposed on the rotating shaft and comprising an assembly portion; and
a connecting rod assembly comprising a first end and a second end, wherein the first end is sleeved on the assembly portion of the transmission component, and the second end is pivotally connected to the cover plate.

11. The electronic device according to claim 2, wherein the first main body is a screen module, and the second main body is a host.

* * * * *